Aug. 14, 1934.                F. STEBLER                1,970,107
                          FEEDING DEVICE
                        Filed July 10, 1930

INVENTOR.
Fred Stebler.
BY
ATTORNEY.

Patented Aug. 14, 1934

1,970,107

UNITED STATES PATENT OFFICE 1,970,107

FEEDING DEVICE

Fred Stebler, Riverside, Calif., assignor to Food Machinery Corporation, San Jose, Calif., a corporation of Delaware Application July 10, 1930, Serial No. 467,102

10 Claims. (Cl. 209—73)

This invention relates to the art of feeding articles to apparatus in which the articles are to be placed in a particular position, and although it may be used with a large variety of articles it is of especial utility when used with rollable articles of more or less elongated shape, such as certain fruits, vegetables, cans, bottles, etc.

Many devices, such as fruit sizing machines, can filling machines, devices for packing articles into receptacles, etc., depend, for their successful operation, upon the manner in which the articles are placed in them. For example, it is usually necessary that all the articles be placed in the apparatus in the same relative positions in proper alignment, in an orderly procession, and in a single layer, and it is with the accomplishment of these results that my invention is concerned.

For the sake of convenience, I shall describe my invention with reference to its use in connection with the grading of fruit such as lemons, according to size, but it will be understood that the problems involved in the handling of other articles and in connection with other devices are similar, and are solved by my invention in substantially the same manner. I, therefore do not wish to limit myself to the construction shown but deem myself entitled to all such embodiments, constructions, modifications and variations as fall within the scope of the claims hereto appended.

Machines for sizing fruits and vegetables of elongated shape, such as lemons, pears, etc., have not been altogether satisfactory, heretofore, by reason of the fact that, as pointed out above, their usefulness is dependent in large measure upon the manner in which the fruit is placed in them for sizing. The fruit cannot be fed to them in a disordered mass, but each individual piece must be placed in them in a particular manner.

One type of machine for the purpose referred to is illustrated in the patent to C. J. Clear No. 1,427,264. This type of machine is commonly provided with a pair of travelling belts arranged in trough-like relation which serve to support and carry the fruit until the belts shall have diverged sufficiently to allow each piece to be released therefrom and deposited in that group to which it belongs.

A consideration of the structure of this type of machine and the characteristics of the fruit to be sized will make clear the difficulties encountered in its operation. It is imperative that such fruits as lemons and pears be handled with the utmost care in order to prevent injury to them. In the case of lemons, the most vulnerable places are the button on the stem end of the fruit and the nipple on the stylar or blossom end. The nipple is particularly tender and is very easily injured, whereupon decay sets in and the fruit is spoiled. The same result may occur when the button is loosened or removed. It is very important, therefore, that the fruit shall receive no blows or shocks at these points.

When feeding means of known construction are used to feed fruit to the sizing belts of machines of the above mentioned type, much of the fruit is deposited in the belts with its long diameter crosswise of the belts, so that the fruit is supported between the belts upon its nipple and button. The shock of the transfer from the feeding means to the sizing means usually results in damage to the nipple or button or both. Even if the fruit is not damaged at this point, it is likely to receive injury by the jarring of the belts as they carry the fruit along or the rubbing contact as the belts diverge and the fruit settles down between them prior to its release.

A further obstacle to the use of such machines for sizing fruits of elongated shape, such as lemons, is that two fruits of identical shape and size may be deposited in different groups by the sizing belts unless they are placed thereon in the same relative positions. A fruit which rests in the belts with its longest diameter crosswise of the belts will be carried past the point where the same fruit would have been released had it been placed with its longest diameter parallel with the belts. The result is that unless all the fruits are placed upon the sizing belts in the same relative position, inaccurate sizing occurs.

Another reason why these machines will not receive fruit in a mass is that the fruit must be placed on the sizing belts in a single layer. It can readily be seen that should fruit be placed on top of each other on the sizing belts, the fruit on top will not be properly sized if it is the smaller for it cannot be released until that underneath is released and when this occurs the smaller fruit is deposited with the larger.

By reason of the above mentioned difficulties, in order to secure accurate sizing without damage to the fruit, it has been necessary to feed the fruit to the machine manually, piece by piece, thus necessitating one or more attendants for each machine. The result is that the sizing process is so expensive, slow, and inefficient, that it has generally been considered preferable to dispense with the sizing apparatus and grade the lemons entirely by hand. Many expedients have been resorted to in the effort to devise a sizing machine which would receive fruit of the type described in a disordered mass and separate it into groups according to size, accurately, without injury to the fruit, and without manual aid, but as far as I am aware, no such machine has been successfully devised prior to my invention.

While I have described some of the difficulties encountered with reference to one particular type of machine, it will be understood that these disadvantages are not confined thereto, but are common to other types of sizing machines as well, and particularly when they are used to size oblong shaped fruits. Moreover, as heretofore pointed out, similar problems are encountered in machines other than fruit sizing machines, so that articles are required to be fed to them in a particular manner, and it will be observed that my invention is applicable in all such cases.

It is a general object to provide a method of feeding articles to machines, in such manner that the articles will be in proper alignment, in the same relative positions, and in a single layer.

It is also an object to provide in machines which require objects to be fed to them in proper alignment, in the same relative positions, and in a single layer, mechanism which will feed the objects to them according to said requirements.

A further object is to construct a machine for the purpose described which will receive a disordered mass of fruit and quickly and accurately separate it into groups according to size without manual aid.

Another object is to provide an apparatus for the purpose described, which shall be adapted to size fruit of a delicate nature without injury thereto.

It is another object to devise such an apparatus which will be adapted to size fruit of elongated shape accurately and without manual aid.

Another object is to provide a fruit sizing machine which shall have a larger capacity than those heretofore known and which can be operated with less labor and expense.

A further object is to construct a fruit sizing apparatus incorporating means for supplying fruit to the sizing means in proper sizing position and in a single layer.

It is a still further object to provide a fruit sizing machine to which fruit can be fed in a disordered mass and which will receive said fruit, present it for inspection, and then separate it into groups according to size, quickly, accurately, and without manual aid.

Many other objects and advantages will become apparent as the description progresses in connection with the accompanying drawing, wherein I have illustrated a preferred embodiment of my invention.

Figure 1:
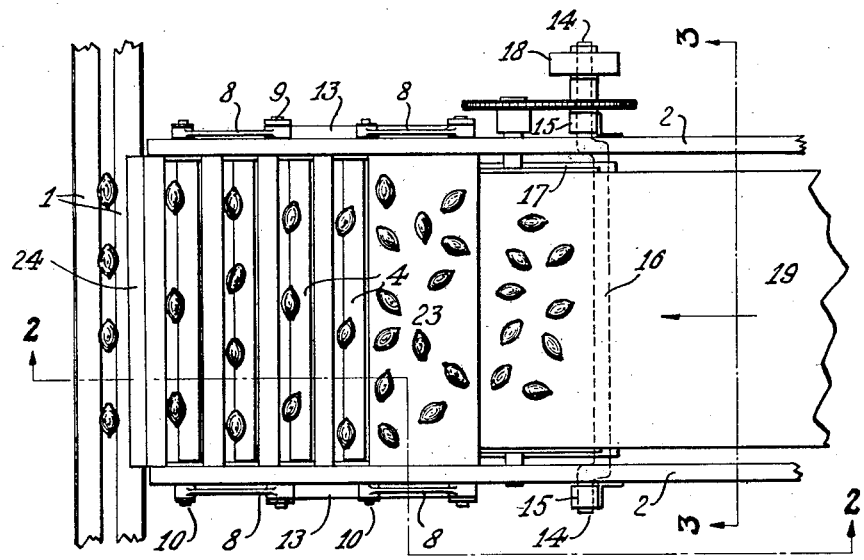
Fig. 1 is a plan view showing so much of the sizing means as is necessary to illustrate my invention.

The apparatus shown comprises a sizing apparatus of the type disclosed in the above mentioned patent, of which I have shown only the diverging sizing belts 1 which are arranged in trough-like relation and are carried upon suitable pulleys (not shown) at each end of the machine. I have not shown further details of the sizing apparatus since they are well known in the art and are not necessary to an understanding of my invention.

Arranged to one side of the sizing belts 1 is an apparatus for feeding fruit thereto which includes the side walls 2 mounted upon suitable supporting legs 3.

Disposed across the lower part of these walls and rigidly secured thereto are a series of obliquely disposed cross bars 4 having their top surfaces set at an angle to the horizontal for a purpose hereinafter explained. A second set of cross bars 5 obliquely disposed in the interstices between the fixed bars 4 are similar thereto except that they are adapted to be reciprocated. I have shown the top edges of all the cross bars slightly rounded whereby to eliminate sharp corners, and they are preferably covered with a protective covering 6 of soft rubber or similar material. This construction minimizes the danger of damage to the fruit as it passes over the bars to the sizing belts.

The reciprocating bars are mounted between suitable supporting rails 7 to which they are rigidly secured in any desired manner. Reciprocation of the bars 5 is accomplished by means of two sets of bell cranks 8 which are loosely pinned to the side walls 2 by pins 9 and to the rails 7 by pins 10 whereby the bars are supported in such manner that movement of the bell cranks is transmitted to the bars. The ends 11 of the right-hand set of bell cranks are connected together by the rod 12 and the two sets are interconnected by means of the connecting links 13. The shaft 14, journaled in bearings 15, is provided with the crank portion 16, which, when rotated, causes oscillation of the bell cranks through the connecting rods 17. The shaft 14 is provided with the pulley 18 which may be connected to any suitable source of power.

For delivering fruit to the above described apparatus, I have shown an ordinary belt conveyor which comprises an endless belt 19 operating over a pair of revoluble drums, one of which is shown at 20. The drum revolves in the direction indicated by the arrow upon the shaft 21, which is mounted in the bearings 22.

A suitable ramp 23 is fixed to the rearmost stationary cross bar 4 and the side walls 2 for the purpose of allowing the fruit to be discharged from the conveyor belt onto the cross bars.

It has been found that unless some means is provided to prevent the pieces of fruit from contacting with the upper portion of one of the sizing belts as it is deposited therein, it may be caused to spin around into crosswise position and in order to prevent this, the apron 24 is provided which may be attached to one of the fixed cross bars as shown, and disposed over the sizing belt in such manner that fruit discharged into the trough or gradeway formed by the sizing belts, will come into contact with both sizing belts substantially simultaneously.

Figure 2:
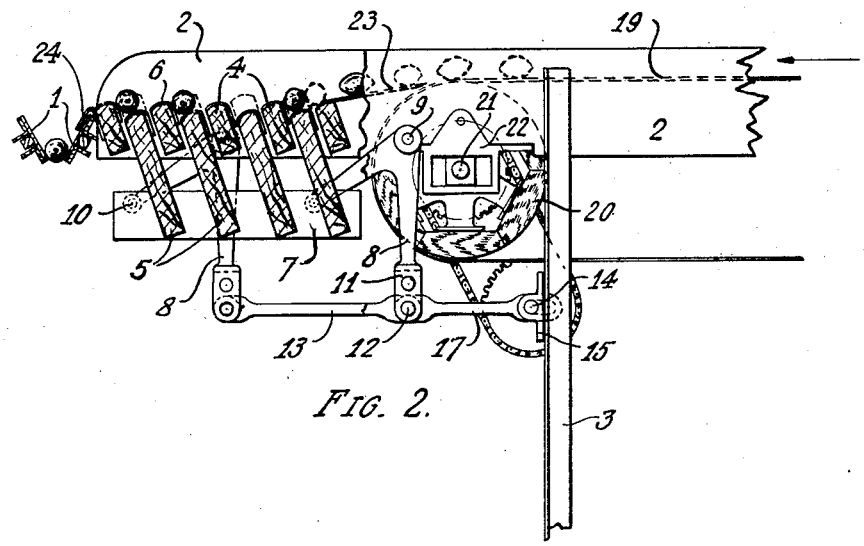
Fig. 2 is a sectional view of the apparatus shown in Fig. 1, taken along the line 2—2 thereof.
Figure 3:
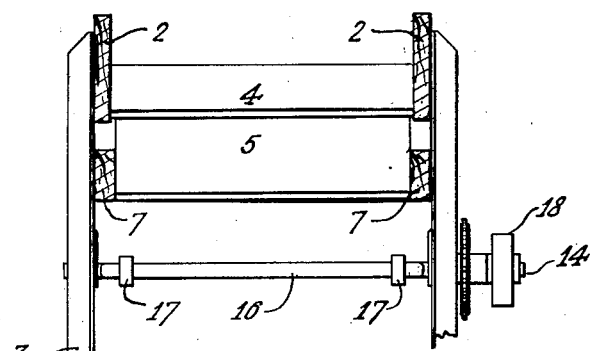
Fig. 3 is a sectional view taken along the line 3—3 of Fig. 1, with the conveyor belt and drum removed.

In operation the fruit to be sized is placed upon the conveyor belt without regard to position or depth. In this condition it is discharged over the ramp onto the cross bars. In Fig. 2 I have shown the uppermost position of the bars 5 in dotted lines. When the bars are in this position, fruit discharged across the ramp will roll downwardly across the sloping top of the fixed cross bar until it lodges against the movable bar. The movable bars then move downwardly until they reach their lowermost position as shown in full lines in Fig. 1, thus releasing the fruit and allowing it to roll across their tops until stopped by the fixed bars. Upon the ensuing upward movement of the bars the fruit is lifted clear of the fixed bar whereupon it rolls across the top of the same until again stopped by the next adjacent movable bar. As the operation is repeated the fruit is separated into aligned groups which are advanced step by step across the bars and finally deposited upon the sizing belts.

It will be noted that while oblong shaped fruits, such as lemons, will roll easily upon their short diameter, they do not roll readily end for end. When, therefore, a lemon is discharged upon one of the sloping surfaces, unless its long diameter is parallel to the direction of slope, gravity will force it to turn and roll upon its short diameter. Should it be so placed that its long diameter is parallel to the direction of slope it will tend to come to rest due to friction, but other fruit will jostle it out of this position so that it will turn and roll down the incline. It will be seen that by the time the lemons have been advanced to the sizing belts they are all aligned so as to be deposited therein in proper sizing position, that is to say, with their long diameters parallel to the belts. Moreover, no injury results to the fruit since their tip ends do not come into contact with the sizing belts.

In the event that the conveyor belt deposits fruit upon the cross bars in a plurality of layers, the operation of the reciprocating bars will advance only that fruit next to the bars whereupon the fruit on top will settle down in its place and be in turn advanced. As pointed out above, the feeding mechanism may embody any number of cross bars to make it of suitable length. The proper length will depend upon operating conditions and generally must be determined by experiment. It will be apparent that the deeper the fruit is deposited upon the conveyor belt, the longer must be the feeding device in order to thin it out into a single layer.

The speed of reciprocation of the cross bars should be regulated according to the speed of the sizing belts so that fruit deposited upon the sizing belts will be carried away from the discharge end of the feeder before the next group of fruit is delivered thereto.

Fruit must be graded as to quality as well as to size, and this is generally done by inspection before sizing. The feeding mechanism disclosed not only serves to deposit the fruit upon the sizing belts in proper position but it also affords an opportunity for inspection. Since the fruit is thinned out into a single layer, each individual fruit is exposed to view, and as it rolls over the cross bars all sides are exposed. The momentary stopping of the fruit at regular intervals during a portion of the downstroke of the reciprocating cross bars is also a material aid to inspection. In this manner, inspectors alongside the feeding mechanism may readily locate and remove all defective fruit.

As heretofore pointed out, the feeding device may be used to feed other articles than fruit, such as bottles, cans, or other rollable articles or packages, and it may be used in conjunction with other devices than sizing machines. For example, the feeder conveyor of a can filling machine or box packing apparatus might be substituted for the sizing belts shown.

Having now described my invention and the manner in which the same may be used, what I claim as new and desire to secure by Letters Patent is:—

1. In combination with a single file conveying means, driving means therefor, a feeder disposed to one side of said conveying means for delivering spaced rows of rollable articles thereto a row at a time, said feeder comprising a series of supporting bars arranged in side by side relation transverse to the path of articles passing thereover, and parallel to the path of articles carried by the conveying means, and means for imparting relative up and down movement to adjacent supporting bars in timed relation to the speed of operation of said conveying means to arrange articles deposited upon said supporting bars into successive spaced rows and to advance and deposit said rows upon said conveying means in timed relation to the operation thereof, whereby each row of articles so deposited upon the conveying means is removed thereby from the path of the next row before the latter is deposited upon the conveyor.

2. In a sizing apparatus, means for conveying and separating a single file of articles into groups according to size, driving means therefor, a feeder disposed to one side of said conveying and separating means for delivering spaced rows of rollable articles thereto a row at a time, said feeder comprising a series of supporting bars arranged in side by side relation transverse to the path of articles passing thereover, and parallel to the path of articles on the conveying and separating means, and means for imparting relative up and down movement to adjacent supporting bars in timed relation to the speed of operation of said conveying and separating means to arrange articles deposited upon said supporting bars into successive spaced rows and to advance and deposit said rows upon said conveying and separating means in timed relation to the operation thereof, whereby each row of articles so deposited upon the conveying and separating means is removed thereby from the path of the next row before the latter is deposited upon the conveying and separating means.

3. In an apparatus for grading articles according to size, a sizing mechanism including spaced sizing elements between which a single file of articles may be supported and advanced, said sizing elements being increasingly spaced apart in the direction of travel of said articles to release said articles at points determined by their sizes, means for driving said sizing mechanism, a feeder disposed to one side of said sizing mechanism for delivering spaced rows of rollable articles thereto a row at a time, said feeder comprising a series of supporting bars arranged in side by side relation transverse to the path of articles passing thereover, and parallel to the path of advance of articles between the sizing elements, and means for imparting relative up and down movement to adjacent supporting bars in timed relation to the speed of operation of said sizing mechanism to arrange articles deposited upon said supporting bars into successive spaced rows, and to advance and deposit said rows between said sizing elements in timed relation to the operation thereof, whereby each row of articles so deposited between the sizing elements is removed thereby from the path of the next row before the latter is deposited between the sizing elements.

4. In an apparatus for grading elongated rollable articles according to size, a sizing mechanism including longitudinally divergent sizing elements for supporting a single file of said articles therebetween, means for driving said sizing mechanism to advance articles supported therebetween until released by the divergence of the sizing elements, a feeder disposed to one side of said sizing elements for delivering elongated rollable articles to said sizing elements in spaced rows of axially aligned articles, a row at a time, said feeder comprising a series of supporting bars arranged in side by side relation transverse to the path of articles passing thereover and parallel to the path of advance of articles between the sizing elements, and means for imparting relative up and down movement to adjacent supporting bars in timed relation to the speed of operation of said sizing mechanism to arrange elongated rollable articles deposited upon said bars into successive spaced rows of axially aligned articles, and to advance and deposit said rows between the sizing elements in timed relation to the operation thereof, whereby each row of articles so deposited between the sizing elements is removed thereby from the path of the next row before the latter is deposited between the sizing elements.

5. In combination with a single file conveying means, driving means therefor, a feeder disposed to one side of said conveying means for delivering spaced rows of rollable articles thereto, a row at a time, said feeder comprising a series of alternately disposed fixed and movable supporting bars arranged in side by side relation transverse to the path of articles passing thereover and parallel to the path of articles carried by the conveying means, and means for elevating and lowering said movable supporting bars in timed relation to the speed of operation of said conveying means to arrange articles deposited upon said supporting bars into successive spaced rows and to advance and deposit said rows upon said conveying means in timed relation to the operation thereof, whereby each row of articles so deposited upon the conveying means is removed thereby from the path of the next row before the latter is deposited upon the conveyor.

6. In a sizing apparatus, means for conveying and separating a single file of articles into groups according to size, driving means therefor, a feeder disposed to one side of said conveying and separating means for delivering spaced rows of rollable articles thereto a row at a time, said feeder comprising a series of alternately disposed fixed and movable supporting bars arranged in side by side relation transverse to the path of articles passing thereover, and parallel to the path of articles on the conveying and separating means, and means for elevating and lowering said movable supporting bars in timed relation to the speed of operation of said conveying and separating means to arrange articles deposited upon said supporting bars into successive spaced rows and to advance and deposit said rows upon said conveying and separating means in timed relation to the operation thereof, whereby each row of articles so deposited upon the conveying and separating means is removed thereby from the path of the next row before the latter is deposited upon the conveying and separating means.

7. In an apparatus for grading articles according to size, a sizing mechanism including spaced sizing elements between which a single file of articles may be supported and advanced, said sizing elements being increasingly spaced apart in the direction of travel of said articles to release said articles at points determined by their sizes, means for driving said sizing mechanism, a feeder disposed to one side of said sizing mechanism for delivering spaced rows of rollable articles thereto a row at a time, said feeder comprising a series of alternately disposed fixed and movable supporting bars arranged in side by side relation transverse to the path of articles passing thereover, and parallel to the path of advance of articles between the sizing elements, and means for elevating and lowering said movable supporting bars in timed relation to the speed of operation of said sizing mechanism to arrange articles deposited upon said supporting bars into successive spaced rows, and to advance and deposit said rows between said sizing elements in timed relation to the operation thereof, whereby each row of articles so deposited between the sizing elements is removed thereby from the path of the next row before the latter is deposited between the sizing elements.

8. In an apparatus for grading elongated rollable articles according to size, a sizing mechanism including longitudinally divergent sizing elements for supporting a single file of said articles therebetween, means for driving said sizing mechanism to advance articles supported therebetween until released by the divergence of the sizing elements, a feeder disposed to one side of said sizing elements for delivering elongated rollable articles to said sizing elements in spaced rows of axially aligned articles a row at a time, said feeder comprising a series of alternately disposed fixed and movable supporting bars arranged in side by side relation transverse to the path of articles passing thereover, and parallel to the path of advance of articles between the sizing elements, and means for elevating and lowering said movable supporting bars in timed relation to the speed of operation of said sizing mechanism to arrange elongated rollable articles deposited upon said bars into successive spaced rows of axially aligned articles, and to advance and deposit said rows between the sizing elements in timed relation to the operation thereof, whereby each row of articles so deposited between the sizing elements is removed thereby from the path of the next row before the latter is deposited between the sizing elements.

9. In an apparatus for grading elongated rollable articles according to size, a sizing mechanism including a pair of longitudinally divergent sizing belts having their working faces disposed in trough like relation for supporting a single file of said articles therebetween, means for driving said sizing mechanism to advance articles supported therebetween until released by the divergence of the sizing belts, a feeder disposed to one side of said sizing belts for delivering elongated rollable articles to said sizing belts in spaced rows of axially aligned articles, a row at a time, said feeder comprising a series of supporting bars arranged in side by side relation transverse to the path of articles passing thereover, and parallel to the path of advance of articles between the sizing belts, a deflecting plate overlying the upper portion of the inner face of the belt adjacent the delivery end of said feeder and in parallel relation to the face of said belt for deflecting articles discharged from the feeder into substantially simultaneous contact with both sizing belts, and means for imparting relative up and down movement to adjacent supporting bars in timed relation to the speed of operation of said sizing belts to arrange elongated rollable articles deposited upon said bars into successive spaced rows of axially aligned articles, and to advance and deposit said rows between the sizing belts in timed relation to the operation thereof, whereby each row of articles so deposited between the sizing belts is removed thereby from the path of the next row before the latter is deposited between the sizing belts.

10. In an apparatus for grading elongated rollable articles according to size, a sizing mechanism including a pair of longitudinally divergent sizing belts having their working faces disposed in trough like relation for supporting a single file of said articles therebetween, means for driving said sizing mechanism to advance articles supported therebetween until released by the divergence of the sizing belts, a feeder disposed to one side of said sizing belts for delivering elongated rollable articles over one side of said trough in spaced rows of axially aligned articles, a row at a time, said feeder comprising a series of supporting bars arranged in side by side relation transverse to the path of articles passing thereover, and parallel to the path of advance of articles between the sizing belts, means for shielding the upper portion of the inner surface of the belt on the delivery side of said trough adjacent the delivery end of the feeder to prevent said articles from contacting with said shielded portion and to deflect them into simultaneous contact with both sizing belts, and means for imparting relative up and down movement to adjacent supporting bars in timed relation to the speed of operation of said sizing belts to arrange elongated rollable articles deposited upon said bars into successive spaced rows of axially aligned articles, and to advance and deposit said rows between the sizing belts in timed relation to the operation thereof, whereby each row of articles so deposited between the sizing belts is removed thereby from the path of the next row before the latter is deposited between the sizing belts.

FRED STEBLER.